United States Patent
Midgley

[11] Patent Number: 6,158,879
[45] Date of Patent: Dec. 12, 2000

[54] INFRA-RED REFLECTOR AND ILLUMINATION SYSTEM

[75] Inventor: Elvin Brent Midgley, Northumberland, United Kingdom

[73] Assignee: Derwent Systems Limited, United Kingdom

[21] Appl. No.: 09/277,112

[22] Filed: Mar. 26, 1999

[30] Foreign Application Priority Data

Mar. 27, 1998 [GB] United Kingdom .................. 9806584

[51] Int. Cl.$^7$ ...................................................... F21V 7/00
[52] U.S. Cl. ........................ 362/347; 362/263; 362/296; 362/341
[58] Field of Search .................. 362/347, 350, 362/263, 296, 341

[56] References Cited

U.S. PATENT DOCUMENTS

| | | | |
|---|---|---|---|
| 4,417,300 | 11/1983 | Raktsch | 362/304 |
| 4,467,239 | 8/1984 | Raktsch | 313/113 |
| 5,142,387 | 8/1992 | Shikamata et al. | |

FOREIGN PATENT DOCUMENTS

| | | |
|---|---|---|
| 2106625 | 4/1983 | United Kingdom . |
| 2111186 | 6/1983 | United Kingdom . |
| 2183362 | 6/1987 | United Kingdom . |
| 2280740 | 2/1995 | United Kingdom . |
| 9423243 | 10/1994 | WIPO . |

*Primary Examiner*—Sandra O'Shea
*Assistant Examiner*—John Anthony Ward
*Attorney, Agent, or Firm*—Morrison Law Firm

[57] ABSTRACT

The intensity of an infra-red light source has substantially increased uniformity over an illuminated area. A reflector of specific size and shape reflects and focuses infra-red light emissions over a given area. Increased uniformity of intensity permits greater clarity in a given field of vision, particularly in a far field of vision. Greater uniformity allows surveillance systems, such as those using closed circuit television, to receive high quality images throughout a field of view. Images received from a far field of view are particularly enhanced.

14 Claims, 2 Drawing Sheets

INFRA-RED REFLECTOR AND ILLUMINATION SYSTEM

BACKGROUND OF THE INVENTION

The present invention relates to an infra-red reflector, and to an infra-red illumination system incorporating such a reflector. More specifically, the invention relates to an infra-red reflector and illumination system for providing a generally uniform intensity of illumination over a chosen area.

Surveillance of buildings, car parks and other premises for security purposes is often achieved with closed circuit television (CCTV) systems. CCTV cameras are normally mounted 6 to 8 meters above the ground to provide surveillance over a chosen area.

During daylight hours, high quality images can be obtained for a near field of vision (5 to 10 meters) in addition to a far field of vision (100 to 150 meters). These high quality images are obtained using simple ambient sunlight as an illumination source.

However, surveillance during night time hours requires an independent illumination source. Typically, an infra-red light source is used as a conventional means of illumination. The chosen area of surveillance is usually illuminated with infra-red lamps mounted above ground or above floor level in the vicinity of the CCTV cameras.

Illumination provided by infra-red sources according to conventional methods has the drawback of rapidly decreasing intensity measured at a distance from the source. This reduction in intensity with distance results from a physical phenomena known as the inverse square law. Because the intensity of illumination is very much greater at a point in the near field, the intensity of illumination of the far field is very much less than that of the near field. As a result, it is very difficult, if not impossible, to achieve sufficiently uniform illumination of the area, with the consequence that adequate quality of images throughout all of the chosen area cannot be achieved.

OBJECTS AND SUMMARY OF THE INVENTION

Accordingly, it is an object of the present invention to provide an infra-red illumination device that overcomes the drawbacks of the prior art.

It is another object of the present invention to provide an infra-red illumination device that has increased uniformity of intensity over a range of field of vison.

It is yet another object of the present invention to provide an infra-red illumination device that has a specific related size and shape to optimize uniformity of infra-red light emission intensity.

It is still another object of the present invention to provide an infra-red illumination device that increases illumination of a far field of vision for a surveillance system.

Briefly stated, an infra-red reflector and illumination system according to the present invention provides an infra-red light source that has substantially increased uniformity over an illuminated area. A reflector of specific size and shape reflects and focuses infra-red light emissions over a given area. Increased uniformity of intensity permits greater clarity in a given field of vision, particularly in a far field of vision. Greater uniformity allows surveillance systems, such as those using closed circuit television, to receive high quality images throughout a field of view. Images received from a far field of view are particularly enhanced.

Reflective surfaces are provided in which at least part of a given reflective surface is a modified parabolic shape. Experiments reveal that illumination provided by a reflector body of this type has an intensity which is considerably more uniform than that of the prior art when the reflector body is mounted above and illuminates a chosen area. Closed circuit television images taken over this chosen area have the advantage of improved quality, especially in a far field of vision.

According to an embodiment of the present invention, there is provided an infra-red illumination device comprising: a reflector body with at least one reflective surface, the at least one reflective surface positioned circumferentially about a longitudinal axis of the reflector body, the reflector body is adapted to receive a source of infra-red light radiation, a radial distance Y from the longitudinal axis to a first point on the at least one reflective surface, an axial distance X along the longitudinal axis from a predetermined reference point on the longitudinal axis to a perpendicular projection of the first point onto the longitudinal axis, the axial and radial distances X and Y are related by a formula $$Y = \sqrt{(4FX)} + \frac{0.7R}{X_m} X - 0.7R$$

wherein F is in the range of from 0.6 cm to 1.3 cm, R is in the range of from 0.1 cm to 0.6 cm, and $X_m$ is in the range of from 5.1 cm to 10.8 cm.

Advantageously, a filter or lens are mounted on an out put end of the reflector body.

According to another embodiment of the present invention there is provided an infra-red illumination device comprising: a reflector body with at least one reflective surface, the at least one reflective surface positioned circumferentially about a longitudinal axis of the reflector body, a source of infra-red light radiation mounted to the reflector body, a radial distance Y from the longitudinal axis to a first point on the at least one reflective surface, an axial distance X along the longitudinal axis from a predetermined reference point on the longitudinal axis to a perpendicular projection of the first point onto the longitudinal axis, the axial and radial distances X and Y are related by a formula $$Y = \sqrt{(4FX)} + \frac{0.7R}{X_m} X - 0.7R$$

wherein F is in the range of from 0.6 cm to 1.3 cm, R is in the range of from 0.1 cm to 0.6 cm, and $X_m$ is in the range of from 5.1 cm to 10.8 cm.

Advantageously, a quartz/halogen lamp is used as the source of infra-red light radiation.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
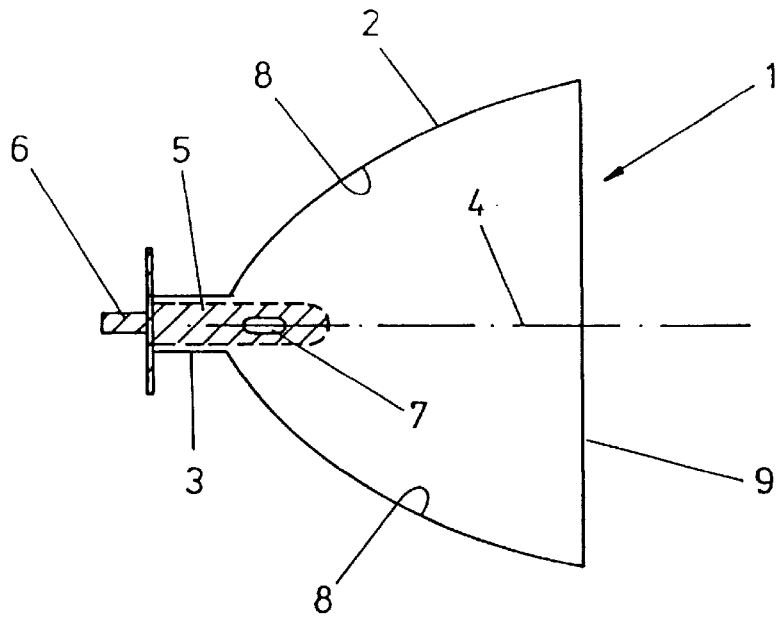
FIG. 1 is a schematic cross-sectional view of an infra-red illumination device according to the present invention.
Figure 2:
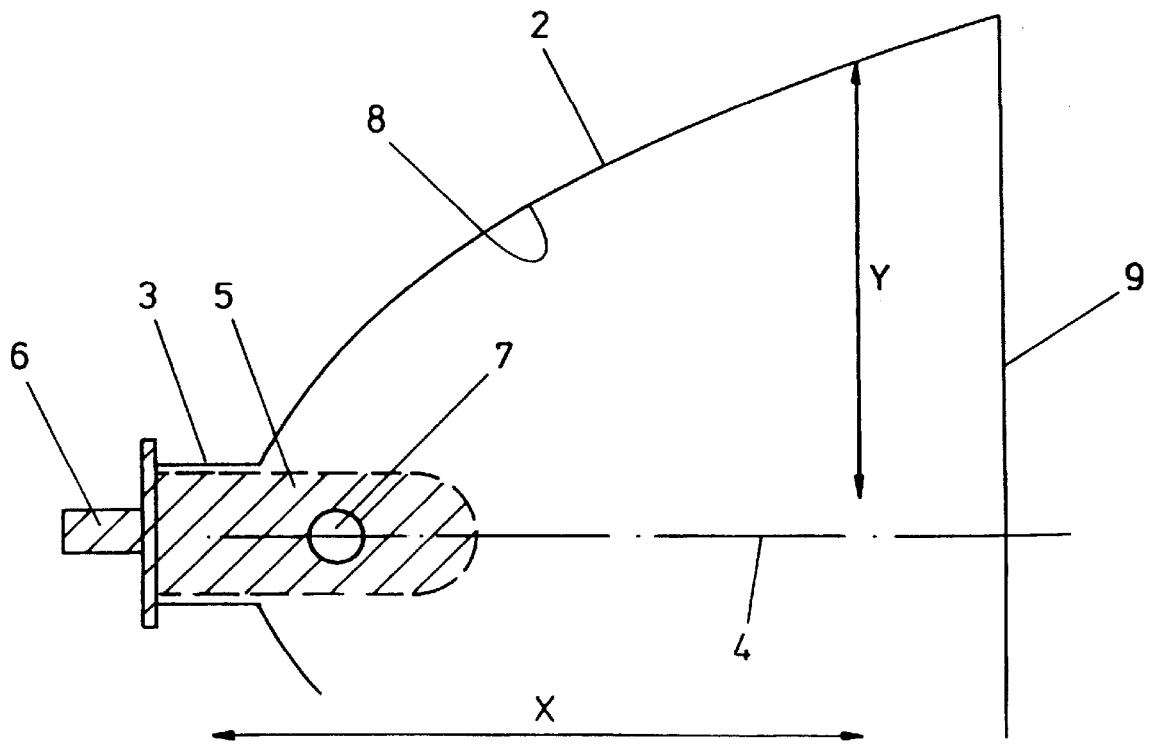
FIG. 2 is a partial schematic cross-section view of an enlarged infra-red illumination device according to the present invention.

Referring to FIG. 1, an infra-red illumination device 1 comprises an infra-red reflector 2 having a cylindrical portion 3. Cylindrical portion 3 is arranged generally coaxially with a longitudinal axis 4 of the reflector body 2. An infra-red source 5, comprising a quartz/halogen bulb with a connector terminal 6 is arranged in cylindrical portion 3. Connector terminal 6 is used to connect the bulb to an electrical power supply (not shown). A tungsten filament 7 is arranged in cylindrical portion 3 with filament 7 aligned on longitudinal axis 4.

Infra-red radiation produced by infra-red source 5 is emitted from the device directly and indirectly. Radiation emitted at an angle of 35 degrees or less with respect to longitudinal axis 4 is directly emitted from the device. This direct infra-red emission lies in a cone about longitudinal axis 4. Indirect emissions are produced by radiation emitted at an angle greater than approximately 35 degrees, i.e., lying outside of the above described cone. This indirect emission is produced by infra-red radiation impinging on the inner surface of reflector body 2. Reflector surfaces 8 on the inner surface of reflector body 2 reflect the radiation in a direction that permits emissions to exit an open end 9 of reflector body 2.

Reflector body 2 has a generally circular cross-section in planes transverse to the longitudinal axis 4. Reflector surface 8 has a modified parabolic shape in planes passing through the longitudinal axis 4. A point on reflector surface 8 is designated on an X-Y coordinate axis. A Y coordinate represents a distance from a point on reflector surface 8 to longitudinal axis 4. An X coordinate represents a distance along longitudinal axis 4 from a predetermined point to a vertical projection of the coordinate point on longitudinal axis 4. A coordinate point on reflector surface 8 satisfies the following formula:

$$Y = \sqrt{(4FX)} + \frac{0.7R}{X_m} X - 0.7R$$

where F is the focal length of the reflector body 2 and is in the range of from 0.6 cm to 1.3 cm; R is the radius of filament 7 and is in the range of from 0.1 cm to 0.6 cm; and $X_m$ is the radius of the open end 9 of the reflector body 2 and is in the range of from 5.1 cm to 10.8 cm.

Figure 3:
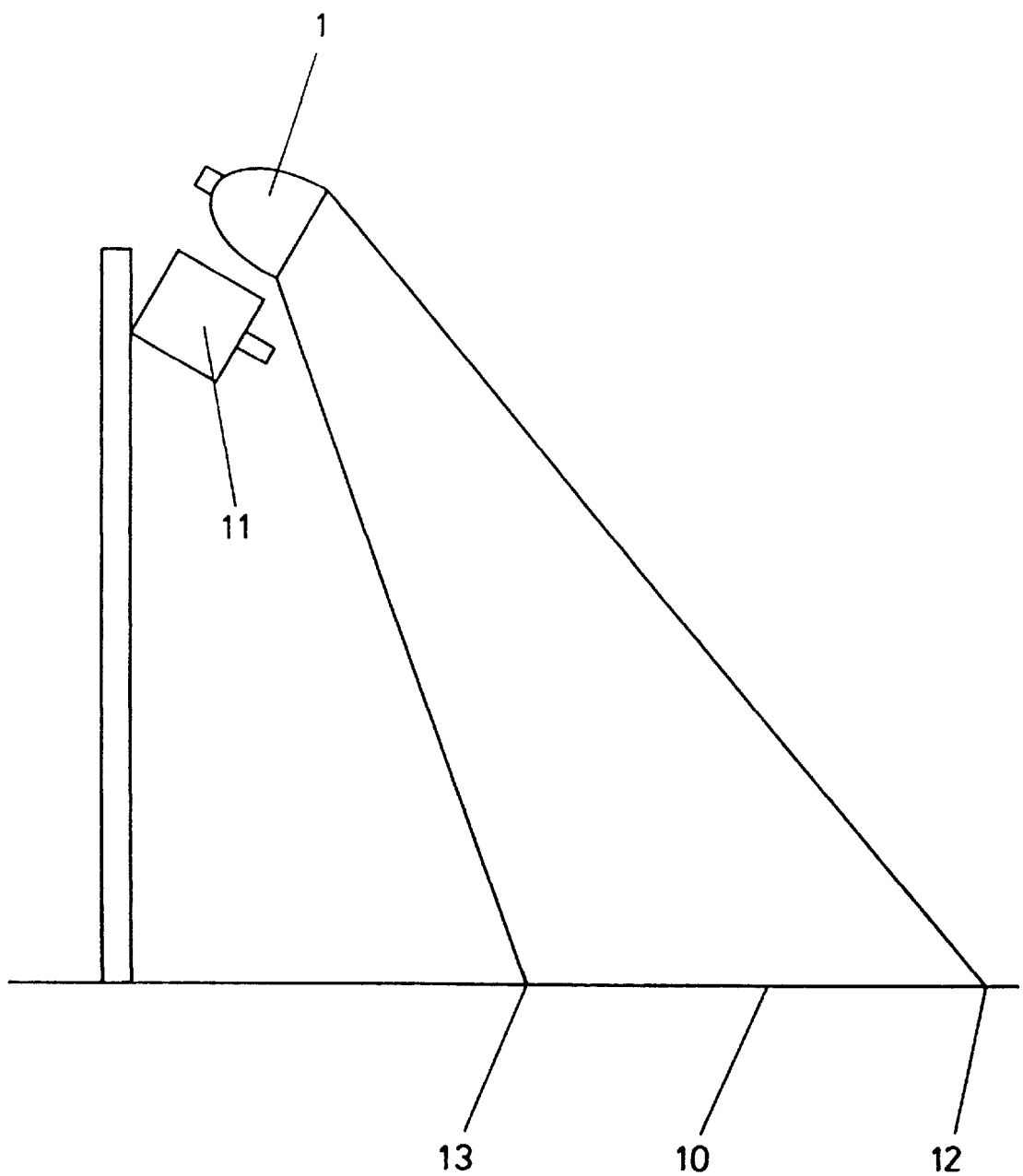
FIG. 3 is a schematic view of a CCTV surveillance system including an infra-red illumination device according to the present invention.

Referring to FIG. 3, infra-red illumination device 1 is mounted about 6 to 8 meters above an area 10 which is monitored by a CCTV camera 11. Experiments reveal that the modified parabolic shape of reflector surface 8 compensates for radiation losses and attendant reduction in intensity over distance. Infra-red light intensity is substantially more uniform between a point 12 at the far field of vision in the area 10, and a point 13 in the near field of vision. This increased uniformity of intensity is achieved for a certain range of mounting heights of the infra-red illumination device 1 above area 10. The uniformity of intensity achieved with infra-red illumination device 1 in the mounting height range is considerably greater than is possible with prior art devices. Thus, infra-red illuminated CCTV images of high quality can be made over a greatly enhanced range of distance during night time hours.

It should be apparent to an artisan of ordinary skill that although the present invention is described for use during night time hours, it is also suitable for use in any darkened area during daylight or night time hours. Such darkened areas would include indoor use such as, for example, in a warehouse.

In addition, the device according to the invention can be fitted with lenses and filters to further adjust the intensity and quality of light emissions.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An infra-red illumination device comprising:

a reflector body with at least one reflective surface;

said at least one reflective surface positioned circumferentially about a longitudinal axis of said reflector body;

said reflector body is adapted to receive a source of infra-red light radiation;

a radial distance Y from said longitudinal axis to a first point on said at least one reflective surface;

an axial distance X along said longitudinal axis from a predetermined reference point on said longitudinal axis to a perpendicular projection of said first point onto said longitudinal axis;

said axial and radial distances X and Y are related by a formula $$Y = \sqrt{(4FX)} + \frac{0.7R}{X_m} X - 0.7R$$

wherein F is in the range of from 0.6 cm to 1.3 cm;

R is in the range of from 0.1 cm to 0.6 cm; and $X_m$ is in the range of from 5.1 cm to 10.8 cm.

2. An infra-red illumination device according to claim 1, wherein said reflector body has substantially circular cross-section about said longitudinal axis.

3. An infra-red illumination device according to claim 1, wherein said reflector body has a substantially rectangular cross-section about said longitudinal axis.

4. An infra-red illumination device according to claim 3, wherein said rectangular cross-section is a square cross-section.

5. An infra-red illumination device according to claim 1, further comprising mounting means for mounting a source of infra-red light radiation thereto.

6. An infra-red illumination device according to claim 5, wherein:

said mounting means includes a substantially cylindrical aperture coaxial with a portion of said longitudinal axis; and said mounting means is adapted to receive a source of infra-red light radiation.

7. An infra-red illumination device according to claim 6, wherein:

said source of infra-red light radiation includes a bulb of substantially circular cross-section.

8. An infra-red illumination device according to claim 1, further comprising a filter on an out put end of said reflector body.

9. An infra-red illumination device according to claim 1, further comprising a lens on an out put end of said reflector body.

10. An infra-red illumination device comprising:

a reflector body with at least one reflective surface;

said at least one reflective surface positioned circumferentially about a longitudinal axis of said reflector body;

a source of infra-red light radiation mounted to said reflector body;

a radial distance Y from said longitudinal axis to a first point on said at least one reflective surface;

an axial distance X along said longitudinal axis from a predetermined reference point on said longitudinal axis to a perpendicular projection of said first point onto said longitudinal axis;

said axial and radial distances X and Y are related by a formula $$Y = \sqrt{(4FX)} + \frac{0.7R}{X_m}X - 0.7R$$

wherein F is in the range of from 0.6 cm to 1.3 cm;
R is in the range of from 0.1 cm to 0.6 cm; and
$X_m$ is in the range of from 5.1 cm to 10.8 cm.

11. An infra-red illumination device according to claim 10, wherein said source is mounted adjacent said longitudinal axis.

12. An infra-red illumination device according to claim 10, wherein said source of infra-red light radiation is a quartz/halogen lamp.

13. An infra-red illumination device according to claim 12, further comprising a filter means on an output end of said reflector body.

14. An infra-red illumination device according to claim 12, further comprising a lens on an output end of said reflector body.

* * * * *